United States Patent
Thorson

(10) Patent No.: US 8,821,338 B2
(45) Date of Patent: Sep. 2, 2014

(54) ELASTIC ROTARY ACTUATOR

(71) Applicant: Fondazione Istituto Italiano di Tecnologia, Genoa (IT)

(72) Inventor: Ivar Thorson, Sherwood, OR (US)

(73) Assignee: Fondazione Istituto Italiano di Tecnologia, Genoa (IT)

( * ) Notice: Subject to any disclaimer, the term of this patent is extended or adjusted under 35 U.S.C. 154(b) by 83 days.

(21) Appl. No.: 13/623,174

(22) Filed: Sep. 20, 2012

(65) Prior Publication Data

US 2013/0074635 A1    Mar. 28, 2013

(30) Foreign Application Priority Data

Sep. 23, 2011    (IT) .............. TO2011A0848

(51) Int. Cl.
| F16H 57/08 | (2006.01) |
| F16D 3/50 | (2006.01) |
| B25J 9/04 | (2006.01) |
| B25J 9/08 | (2006.01) |

(52) U.S. Cl.
CPC . *F16D 3/50* (2013.01); *B25J 9/042* (2013.01); *B25J 9/08* (2013.01); *B25J 9/04* (2013.01)
USPC ............................................. 475/331

(58) Field of Classification Search
USPC ......... 475/149, 150, 221, 225, 331, 337–339, 475/346, 347; 74/411, 470, 473.28, 582, 74/421 A, 490.05, 490.06; 901/9, 14, 19, 901/21
See application file for complete search history.

(56) References Cited

U.S. PATENT DOCUMENTS

| 3,960,036 | A | * | 6/1976 | Moller ........................ 475/255 |
| 4,096,763 | A | * | 6/1978 | Kell ................................ 74/69 |
| 5,672,135 | A | * | 9/1997 | Hamada ....................... 475/149 |
| 2010/0276896 | A1 | * | 11/2010 | Sano ......................... 280/5.509 |
| 2011/0067517 | A1 | | 3/2011 | Ihrke |
| 2011/0214354 | A1 | * | 9/2011 | Talpe ............................ 49/324 |
| 2012/0264562 | A1 | * | 10/2012 | Park ............................ 475/331 |

FOREIGN PATENT DOCUMENTS

| DE | 102006020922 A1 | 11/2007 |
| EP | 1972414 A1 | 9/2008 |
| EP | 2006055 A1 | 12/2008 |

* cited by examiner

*Primary Examiner* — Justin Holmes
(74) *Attorney, Agent, or Firm* — Robert E. Alderson, Jr.

(57) ABSTRACT

Rotary actuators having a final output member rotatable about an axis of rotation; a motor unit designed to drive the final output member for rotation about the axis of rotation; and an elastic unit arranged between the motor unit and the final output member and having an input member torsionally coupled to the motor unit and an output member rigidly connected for rotation with the final output member are provided.

12 Claims, 6 Drawing Sheets

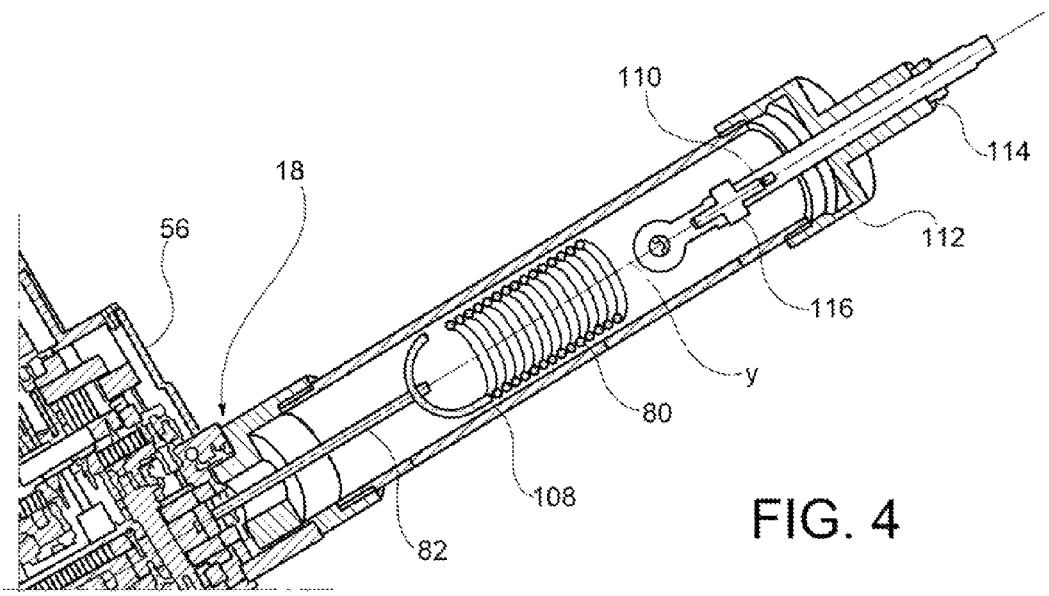
FIG. 4
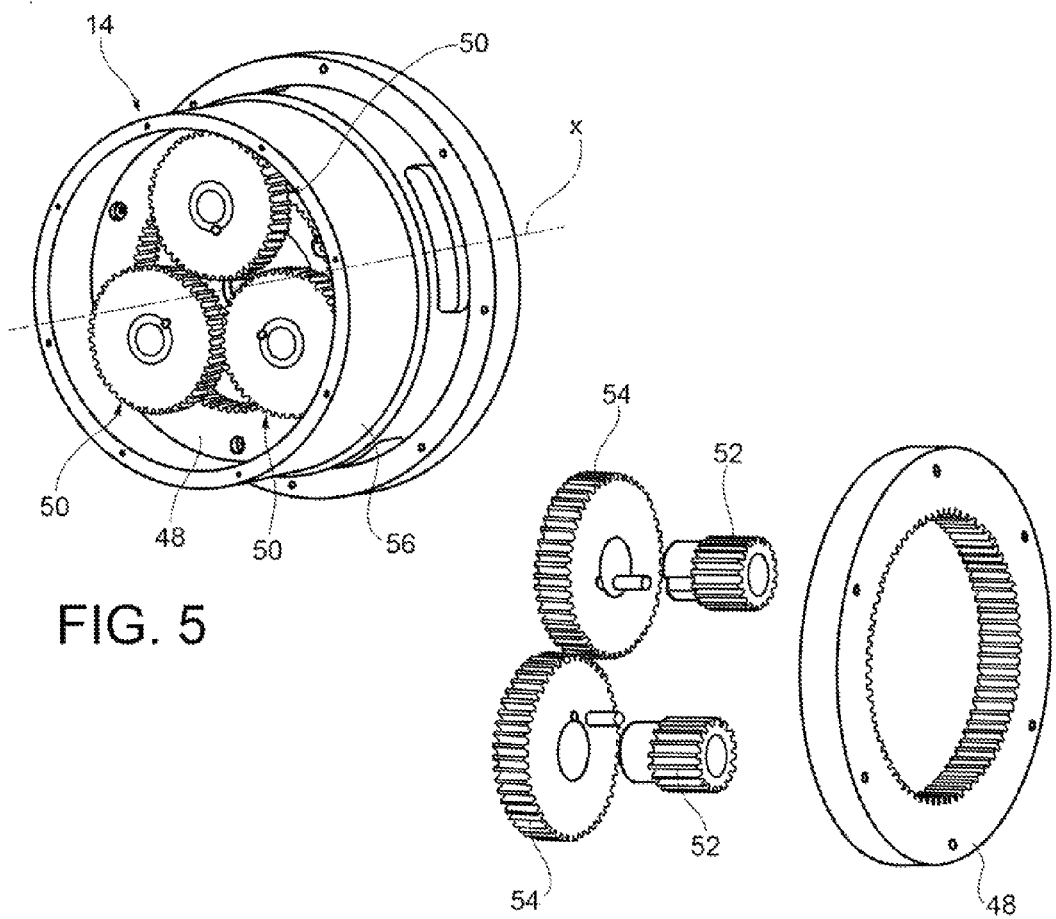
FIG. 5
FIG. 6

ELASTIC ROTARY ACTUATOR

CROSS REFERENCE TO RELATED APPLICATION

This application claims priority to and benefit of Italian Patent Application No. TO2011A000848 filed Sep. 23, 2011, the contents of which are incorporated by reference in their entirety.

FIELD OF THE INVENTION

The present invention relates to a rotary actuator, in particular for applications in the robotics sector, where the term "rotary actuator" is to be understood as referring to a device able to produce at its output a rotary movement about an axis of rotation by producing a torque about the axis.

BACKGROUND OF THE INVENTION

In the future, robotics will rely heavily on control algorithms operating in the domain of force and torque control, since this permits applications which cannot be implemented with position control alone. For example, without an accurate measurement of the forces generated by a robot, it is impossible to handle with precision delicate non-modelled objects or interact with man in safe conditions in an unstructured environment. The rotary actuators used nowadays have considerable limitations which make them unsuitable for this type of control.

The characteristics which a rotary actuator should ideally possess are the following:
  high maximum torque,
  high maximum angular speed,
  high power/weight ratio,
  high energy performance,
  high force generation bandwidth, and
  low mechanical impedance in the event of position disturbances.

The term "mechanical impedance" is to be understood as referring to the apparent inertia of a system in response to a disturbance, namely the torque effectively produced when a disturbance (force or torque) is applied to an actuator which is programmed so as to produce zero torque. The torque which is effectively produced depends on the speed at which the disturbance is applied, for which reason the mechanical impedance is often analysed with reference to a particular frequency. With fast control loops it is possible to reduce the mechanical impedance at speeds lower than the frequency of the control loop, but at higher speeds only mechanical effects are involved. In real systems, it is never possible, even below the control frequency, to eliminate completely the mechanical impedance owing to the frictional forces and the inertial forces due to the non-suspended mass.

Most currently available rotary actuators for robotic applications have a limited force/torque control capacity. Hydraulic actuators have excellent maximum torque, maximum speed and power/weight ratio characteristics, but very high mechanical impedance. Therefore it is difficult to use these actuators in actuating systems with torque control. Pneumatic actuators have an intrinsic compliance because they contain a compressible gas, but they are affected by band control problems owing to the limits of their valves in terms of flow rate and tightness. Electric actuators are fast, but generally they are able to produce low torques and therefore require the use of reduction units which are subject to high friction and therefore increase considerably mechanical impedance. One way to improve the torque control properties of electric actuators is to use an elastic element—typically a spring made of metallic material—for connecting the electric motor to the external load. If the position of the external load is perturbed by a disturbance, the force in the spring starts to increase. Since, however, the inertia of the spring is very low, this force varies very gradually, unlike that which happens with the use of reduction units which have high inertia. In this way, the addition of an elastic element in series decouples to a certain extent the movements of the electric motor and of the external load. Even though the addition of an elastic element reduces the capacity of the actuator to generate rapidly a high torque, since the elastic element must be deformed significantly in order to be able to generate a high force, it also increases the resistance to breakage in the event of pulsed loads and in particular the reliability of the force/torque control. Elastic rotary actuators are therefore becoming more and more widespread in the robotics sector.

An elastic rotary actuator of the type mentioned above is described in EP1972414 and comprises a cam mechanism acting on the elastic means so as to produce a deformation of said elastic means which is variable in a non-linear manner depending on the angle of rotation of the final output member. Such actuators, however, still suffer from significant performance problems which limit their use in certain applications.

SUMMARY OF THE INVENTION

One object of the present invention is to provide an elastic rotary actuator of the above-mentioned type which has higher performances than those of the prior art, in particular in terms of the capacity to store elastic energy and precise control of the torque transmitted to the external load.

This and other objects are fully achieved according to the present invention by means of an elastic rotary actuator having the characteristics defined in the accompanying claims.

More particularly, the present invention relates to elastic rotary actuators, i.e. a rotary actuator comprising an elastic element arranged between the motor and the final output member, in such a way that transmission of the torque between the motor and the final output member takes place via the elastic element.

BRIEF DESCRIPTION OF THE DRAWINGS

The characteristics and the advantages of the present invention will become clear from the following detailed description, given purely by way of a non-limiting example with reference to the following drawings.

FIG. 4 is a cross-section view of the elastic unit of the elastic rotary actuator of FIG. 1.

FIG. 5 is a perspective view of the reduction unit of the elastic rotary actuator of FIG. 1.

FIG. 6 is an exploded view of the planetary gearing of the reduction unit of FIG. 5;

DETAILED DESCRIPTION

Figure 1:
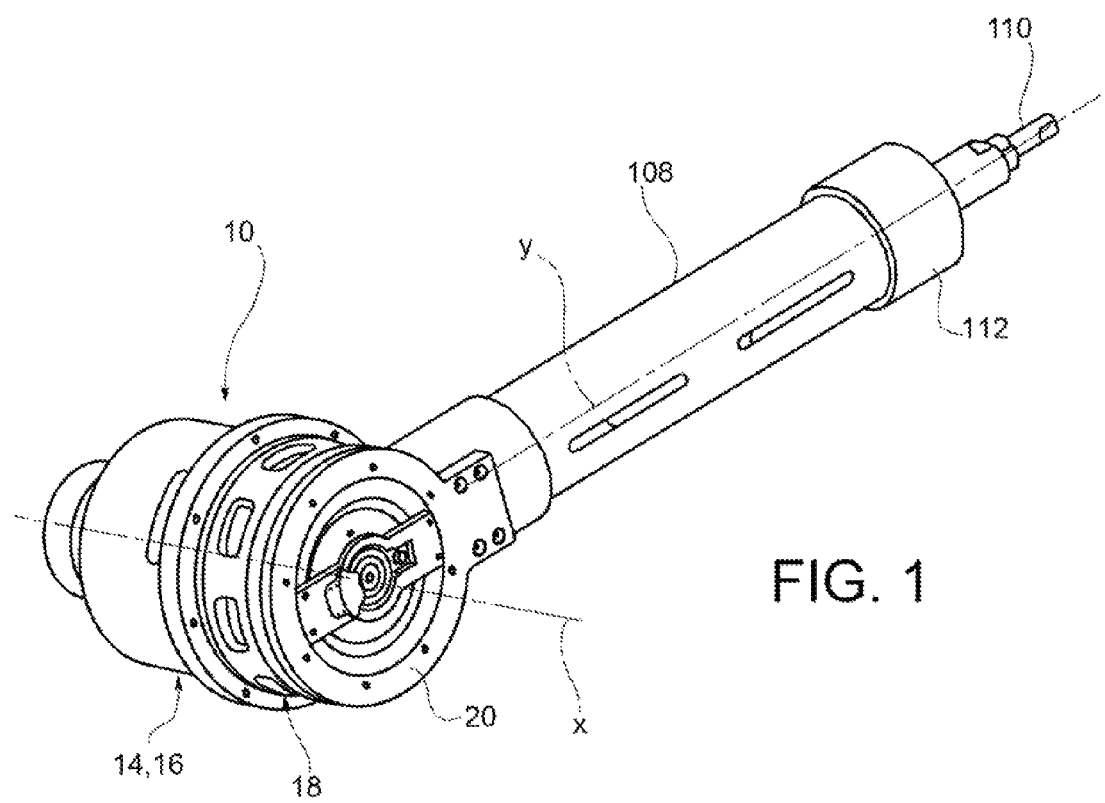
FIG. 1 is a perspective view which shows in its entirety an elastic rotary actuator according an embodiment of the present invention.
Figure 2:
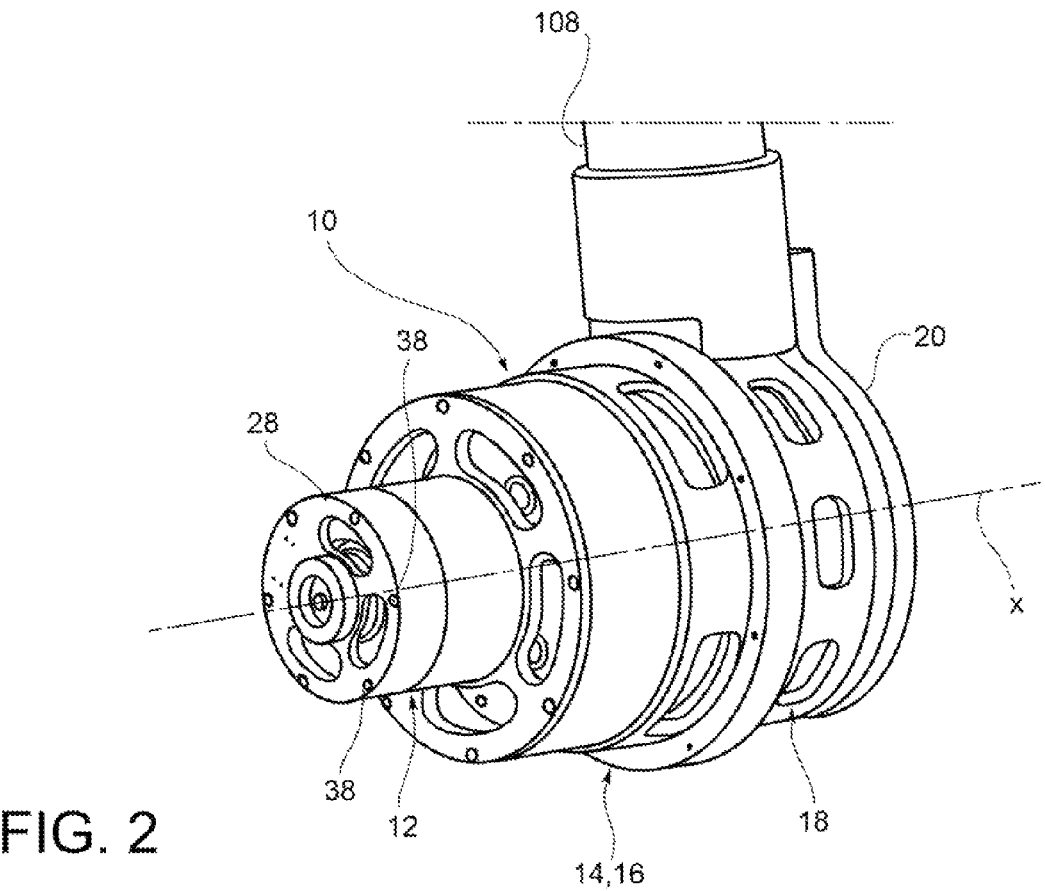
FIG. 2 is a further perspective view of the elastic rotary actuator of FIG. 1.
Figure 3:
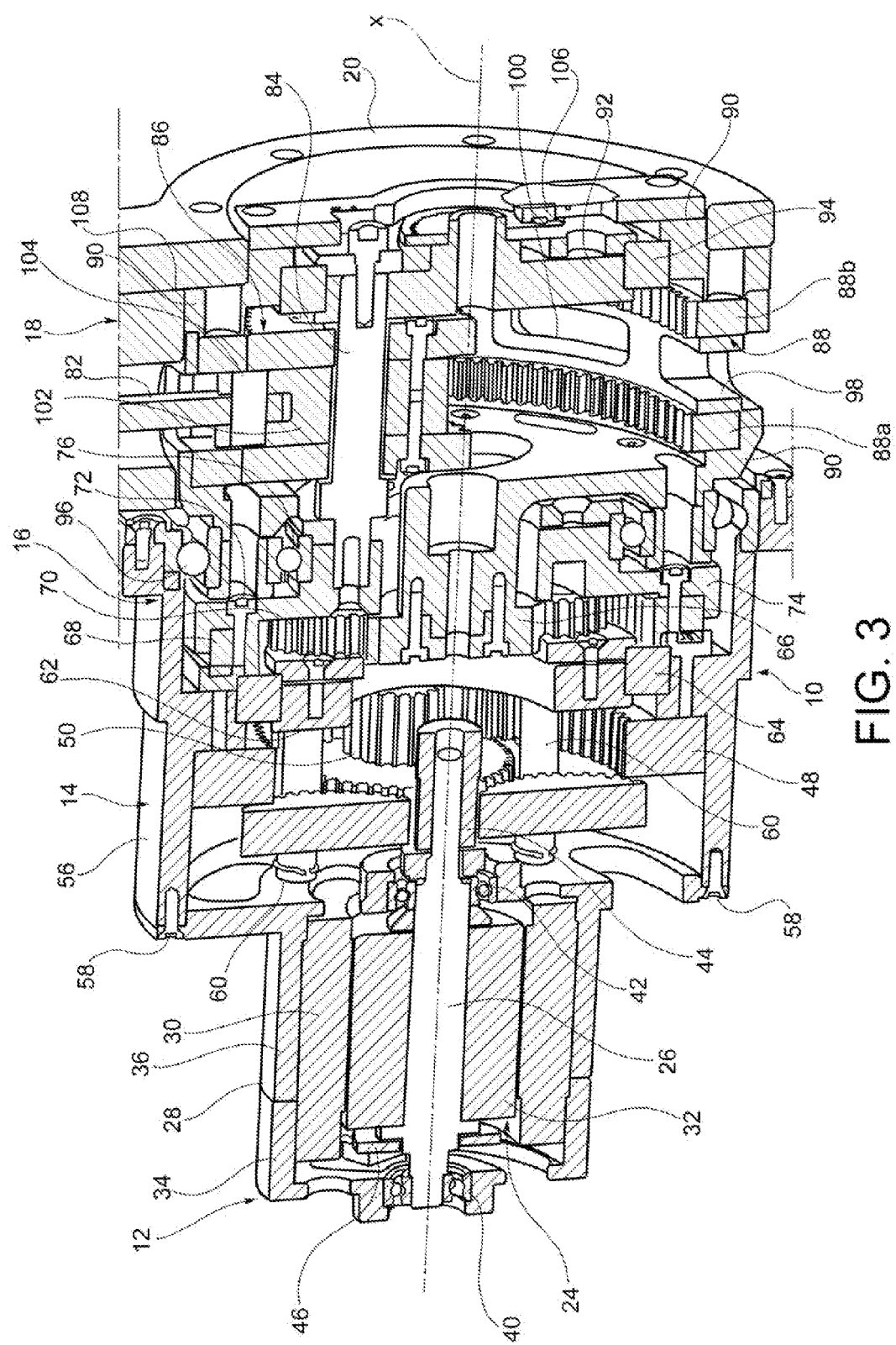
FIG. 3 is an axial section view of the elastic rotary actuator of FIG. 1.

With reference initially to FIGS. 1 to 3, elastic rotary actuators according to certain embodiments of the present invention are generally indicated 10 and may include a motor unit 12, a reduction unit 14, a differential unit 16, an elastic unit 18 and an final output member 20, the final output member 20 being supported rotatably about an axis of rotation x and being intended to be connected to an external load (not shown), the motor unit 12 being designed to generate a rotary movement about the axis of rotation x, and the reduction unit 14, the differential unit 16 and the elastic unit 18 being arranged axially (where the term "axially", as well as the term "axial", are used here to indicate the direction of the axis of rotation x) in that order between the motor unit 12 and the final output member 20 so as to transmit to the final output member 20 the rotary movement generated by the motor unit.

With reference in particular to FIG. 3, the motor unit 12 may include an electric motor 24, such as a 12-pole brushless motor, a drive shaft 26 designed to be rotationally driven by the electric motor 24 about the axis of rotation x and a casing 28 inside which the electric motor 24 is housed. The electric motor 24 may include, in a manner known per se, a stator 30 which is kept firmly fixed inside the casing 28 and a rotor 32 which is housed inside the stator 30 and arranged coaxially therewith. The casing 28 may include a first casing element 34 and a second casing element 36 (arranged on the left and on the right, respectively, as viewed when looking at FIGS. 2 and 3), said casing elements being fixed to each other by means of screws 38 (FIG. 2) so as to clamp axially the stator 30. The drive shaft 26 may be supported rotatably by means of a pair of bearings 40 and 42 which are respectively mounted on the first and second casing elements 34 and 36. The rotor 32 may be fitted onto drive shaft 26 so as to be drivingly connected for rotation therewith. A gearwheel 44 operating as a sun gear of the reduction unit 14, as will be explained in greater detail below, may be mounted on one end of the drive shaft 26 (right-hand end, as viewed when looking at FIG. 3), the gearwheel 44 being rigidly connected for rotation with the drive shaft 26, for instance by means of a locking screw, a key or a cotter pin. The motor unit 12 also may include an optical encoder 46 or other type of angular position sensor (such as a potentiometer, a Hall effect sensor, etc.) which is designed to detect the angular position of drive shaft 26. The motor unit 12 therefore converts electric energy into mechanical energy in the form of torque and angular speed made available at the gearwheel 44.

The reduction unit 14, the function of which is to effect a reduction in the angular speed (for example with a transmission ratio τ of between about 1:12 and about 1:24) between an input member, consisting of the gearwheel 44 which is directly rotationally driven by the electric motor 24, and an output member, will be described now. With reference to FIGS. 3, 5 and 6, in the embodiment shown therein the reduction unit 14 may be made as a planetary gearing and may include the aforementioned gearwheel 44 operating as a sun gear, an internal-tooth ring gear 48 and a plurality of double planet gears 50 (in the embodiment shown, three double planet gears arranged at 120°) identical to each other. Each double planet gear 50 may include a first planet gear 52 and a second planet gear 54 rigidly connected for rotation with each other, wherein the first planet gear 52 has a smaller number of teeth than the second planet gear 54. The first planet gears 52 may each mesh with the internal-tooth ring gear 48, while the second planet gears 54 may each mesh with gearwheel 44. The internal-tooth ring gear 48 may be fixed to a casing 56 inside which both the reduction unit 14 and the differential unit 16 are housed. The casing 56 may be fixed by means of screws 58 to the casing 28 of the motor unit 12. Each double planet gear 50 may be mounted freely rotatably on a respective shaft 60 supported by a planet carrier 62 which acts as an output member of the reduction unit 14. The shafts 60 may be force-fitted inside respective through-holes provided in the planet carrier 62 so as to be rotationally locked with respect to this latter. The planet carrier 62 may be supported rotatably about the axis of rotation x by means of a bearing 64 mounted in the casing 56. As result of the reduction operated by the planetary gearing, the angular speed of the planet carrier 62 may be reduced by a factor 1/τ (ranging between about 12 and about 24, for instance) compared to that of the gearwheel 44.

Figure 7:
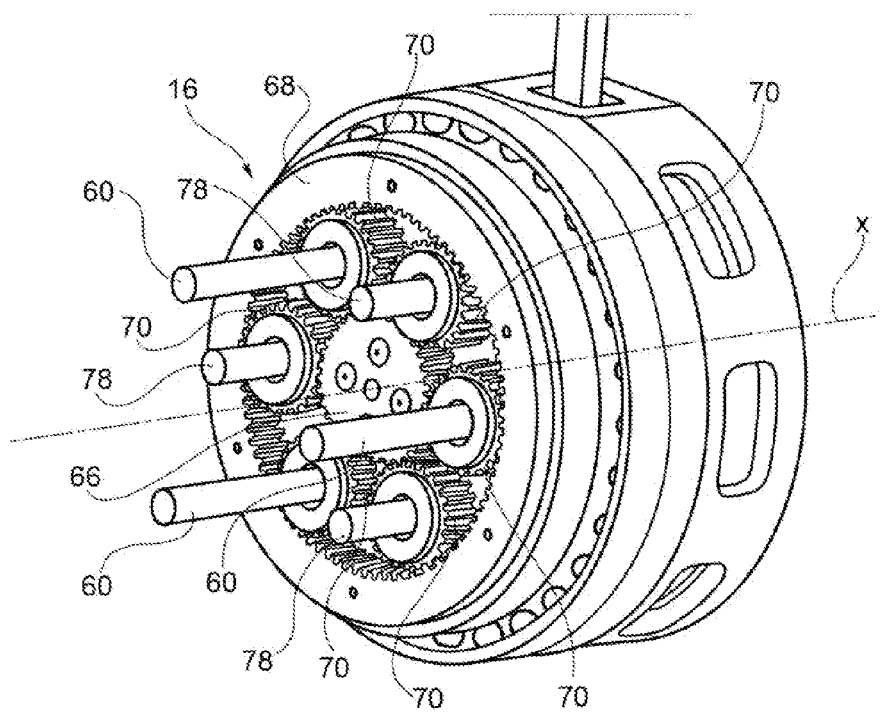
FIG. 7 is a perspective view of the differential unit of the elastic rotary actuator of FIG. 1.
Figure 8:
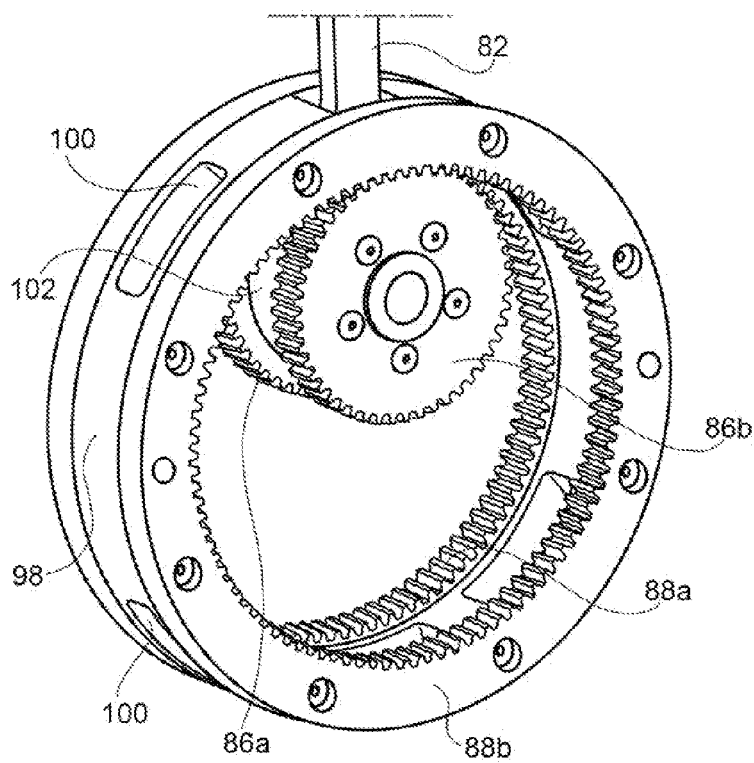
FIGS. 8 and 9 are perspective views of the hypocycloid mechanism of the elastic rotary actuator of FIG. 1.
Figure 9:
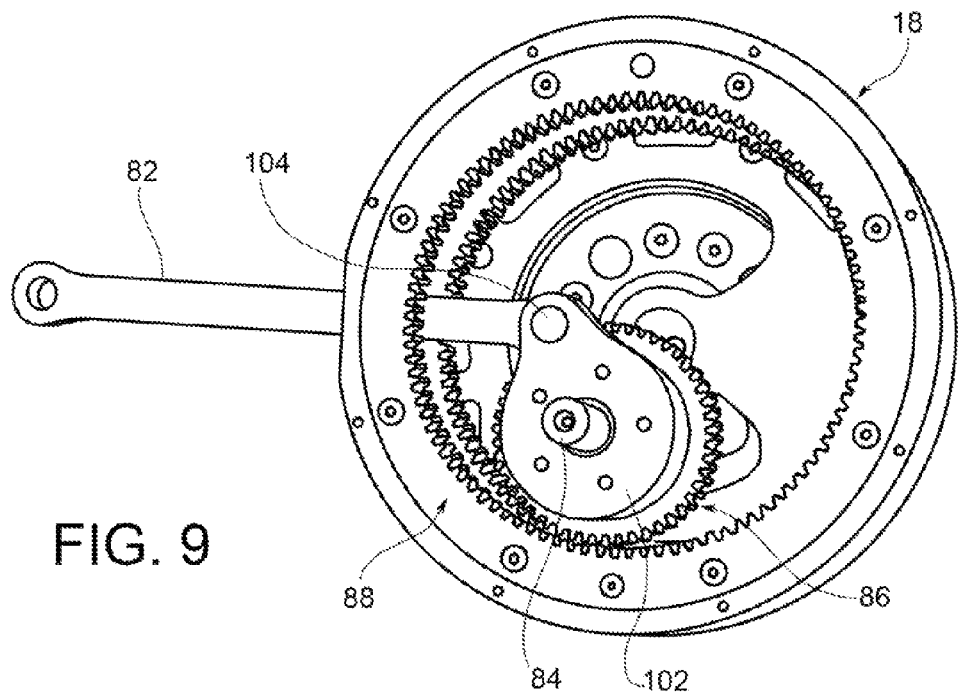
Figure 10:
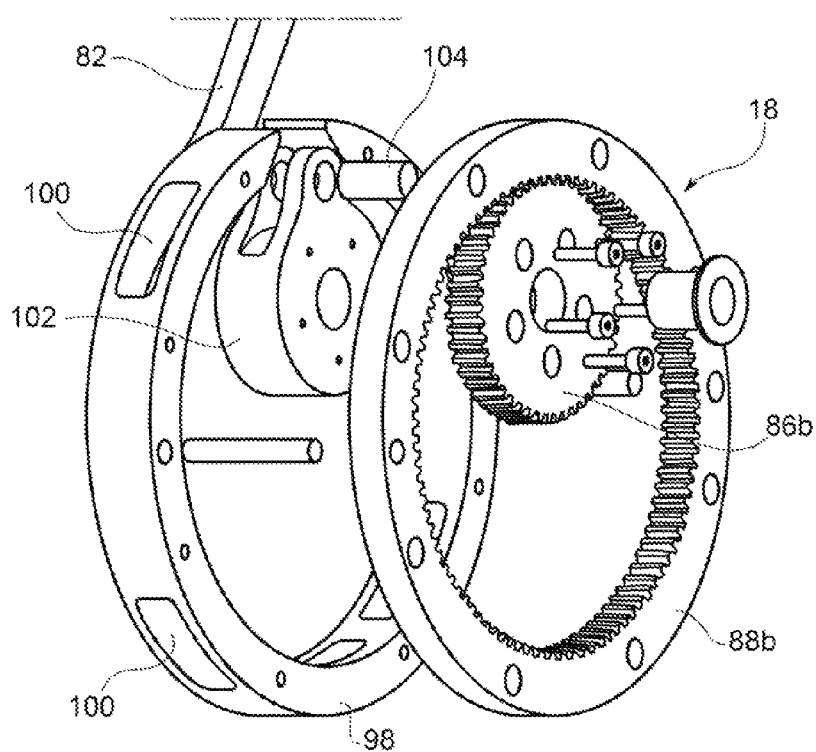
FIG. 10 is an exploded view of the hypocycloid mechanism of FIGS. 8 and 9.

The differential unit 16, the function of which is to double the difference between the angular position of the planet carrier 62 (which, as mentioned, forms the output member of the reduction unit 14) and that of the final output member 20 of the actuator, will be described now with reference to FIGS. 3 and 7. In the embodiment shown, the differential unit 16 may be made as a planetary gearing, like the reduction unit 14, with which it shares the planet carrier. More precisely, the differential unit 16 may include a sun gear 66, an internal-tooth ring gear 68 and a plurality of planet gears 70 permanently meshing both with the sun gear 66 and with the internal-tooth ring gear 68. The internal-tooth ring gear 68 may be rigidly connected for rotation by means of screws 72 with a support member 74, which may be supported rotatably about the axis of rotation x by means of a bearing 76. The planet gears 70 may be six in number, three of which are mounted freely rotatably on the shafts 60 of the planet carrier 62 of the reduction unit 14, i.e. on the same shafts on which the double planet gears 50 of the reduction unit 14 are mounted, while the remaining three may be mounted freely rotatably on further shafts 78 supported by the planet carrier 62 of the reduction unit 14. Like the shafts 60 of the reduction unit 14, the shafts 78 of the differential unit 16 also may be force-fitted inside respective through-holes provided in the planet carrier 62 so as to be rotationally locked with respect to the planet carrier 62. The differential unit 16 therefore may have as input the planet carrier 62 of the reduction unit 14 and as output the assembly formed by the internal-tooth ring gear 68 and the support member 74.

The elastic unit 18 will now be described, with reference in particular to FIGS. 3 and 4 and FIGS. 8 to 10. The elastic unit 18 may be axially interposed between the differential unit 16 (or alternatively, in case there is no differential unit 16, between the reduction unit 14) and the final output member 20 and may include a spring 80 and a hypocycloid mechanism designed to deform the spring 80 as a result of a rotation of the final output member 20 relative to the drive shaft 26.

As is known, a hypocycloid is a flat curve generated by the trajectory of a point fixed to the perimeter of a smaller-radius circle rolling without slipping inside a larger-radius circle. The shape of the hypocycloid depends on the ratio of the radii of the two circles. If this ratio is an integer n, then the hypocycloid will have a number n of cusps which are angularly equally spaced. In the particular case where the ratio n is equal to 2, the hypocycloid is a straight line.

In certain embodiments, the hypocycloid mechanism used in the elastic unit 18 is of this type and is used in particular to convert the rotary movement of a rotating input member (corresponding to the smaller-radius circle) relative to a rotating output member (corresponding to the larger-radius circle) into a translational movement of a connecting rod 82 connected to one end of the spring 80. More specifically, in certain embodiments the rotating input member of the hypocycloid mechanism is torsionally coupled, via the reduction unit 14 and the differential unit 16 (if any), to the drive shaft 26, while the rotating output member of the hypocycloid mechanism is torsionally coupled to the final output member 20, in such a way that a rotation of the final output member 20 relative to the drive shaft 26 is converted by the hypocycloid mechanism into a translational movement of the connecting rod 82, and therefore into a deformation of the spring 80.

From a constructional point of view, in certain embodiments proposed here the hypocycloid mechanism may include, in addition to the aforementioned connecting rod 82, a shaft 84, a gearwheel assembly 86, a ring gear assembly 88 and a body 90 with which the final output member 20 is rigidly connected for rotation. The shaft 84 may extend with its axis parallel to the axis of rotation x, at a certain distance therefrom, and may be fixed at one of its ends (left-hand end, as viewed when looking at FIG. 3) to the support member 74 of the differential unit 16. The shaft 84 therefore may rotate integrally with the internal-tooth ring gear 68 of the differential unit 16, describing with its axis a circumference about the axis of rotation x. The shaft 84 may be supported at the opposite end by a plate 92 which is rotatably supported with respect to the body 90 by means of a bearing 94. The body 90 may be rotatably mounted with respect to the casing 56 of the reduction unit 14 and the differential unit 16 by means of a bearing 96 and may be rigidly connected for rotation with the sun gear 66 of the differential unit 16. The ring gear assembly 88 may include two internal-tooth ring gears 88a and 88b with the same number of teeth and a spacer member 98 which is axially interposed between the two internal-tooth ring gears 88a and 88b and may be rigidly connected for rotation therewith. The spacer member 98 may include at least one window 100 through which the connecting rod 82 radially extends. The ring gear assembly 88 may be fixed to the body 90 and may be arranged with its axis coinciding with the axis of rotation x.

The gearwheel assembly 86 may include two gearwheels 86a and 86b with the same number of teeth and a spacer member 102 which may be axially interposed between the two gearwheels 86a and 86b and may be rigidly connected for rotation therewith. The gearwheel assembly 86 may be freely rotatably mounted on the shaft 84. The gearwheels 86a and 86b may mesh respectively with the internal-tooth ring gears 88a and 88b and have a number of teeth half that of the internal-tooth ring gears 88a and 88b. The spacer member 102 of the gearwheel assembly 86 may be hinged to one end (proximal end) of the connecting rod 82 by means of a hinge pin 104, the axis of which may be positioned exactly on the pitch circle of the gearwheels 86a and 86b. Owing to the configuration described above, the hypocycloid mechanism may produce, as a result of a rotation of the final output member 20 (which is rigidly connected for rotation, via the body 90, with the ring gear assembly 88) relative to the drive shaft 26 (which is connected for rotation with the shaft 84, via the reduction unit 14 and the differential unit 16, with a given transmission ratio), a displacement of the axis of the hinge pin 104 along a direction of deformation y passing through the axis of rotation x and perpendicular to said axis.

The elastic unit 18 may further include an optical encoder 106, or other type of angular position sensor (such as a potentiometer, a Hall effect sensor, etc.) designed to detect the relative angular position of the final output member 20 with respect to the plate 92, and therefore to the shaft 84. According to certain embodiments proposed, therefore, the absolute angular position of the final output member 20 may be measured not directly, but indirectly on the basis of the measurements supplied by the sensors 46 and 106.

With reference in particular to FIGS. 1, 3 and 4, the spring 80 of the elastic unit 18 may be housed inside a casing 108 which is fixed to the body 90. In such embodiments, the spring 80 may be a helical spring oriented with its axis along the direction of deformation y and the casing 108 may be a tubular body with its axis oriented along the direction of deformation y. The spring 80 may be connected on one side to the distal end of the connecting rod 82 and on the opposite side to a tensioning member 110 which may be operated by the operator to vary the preload of the spring 80. The tensioning member 110 may be for example made as a threaded rod which engages in a threaded hole provided in a cover 112 which is mounted freely rotatably on the distal end of the casing 108 and functions as a nut screw, in such a way that rotation of the cover 112 in either direction causes a displacement in either direction of the tensioning member 110 along the deformation direction y and therefore an increase or a reduction in the preload of the spring 80. A locking nut 114 may be screwed onto the threaded portion of the tensioning member 110 so as to tighten the tensioning member 110 against the cover 112 and thus prevent undesirable relative rotation of these two components once the desired preload has been set. The elastic unit 18 may further include a load cell 116, or other force-measuring sensor, designed to measure the tensile force acting on the spring 80.

Figure 11:
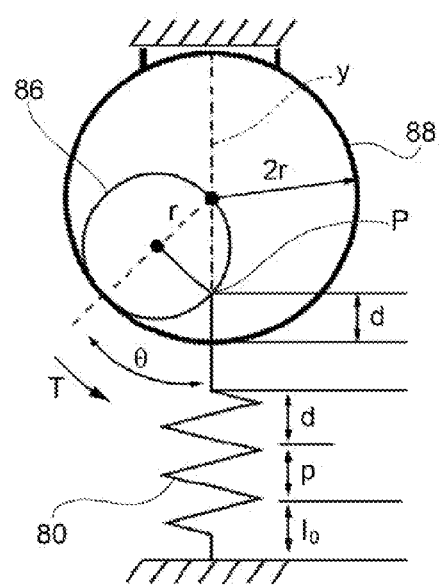
FIG. 11 is a schematic diagram illustrating the operating principle of the hypocycloid mechanism of FIGS. 8 and 9.

The operating principle of an embodiment of the hypocycloid mechanism described above is schematically illustrated in the diagram of FIG. 11. In this figure, the gearwheel assembly 86 and the ring gear assembly 88 are shown respectively as a circle with radius r (hereinafter referred to for the sake of simplicity as the smaller circle) and as a circle with radius 2r (hereinafter referred to for the sake of simplicity as the larger circle). The larger circle is shown as a stationary circle, while the smaller circle rolls without slipping along the perimeter of the larger circle. The angle of relative rotation of the input member (shaft 84) with respect to the output member (body 90, with which the final output member 20 is rigidly connected for rotation) of the hypocycloid mechanism is indicated $\theta$ in FIG. 11 and hereinafter will be referred to simply as deflection angle. In the model according to FIG. 11, the deflection angle $\theta$ corresponds to the angle between the direction of deformation y and the direction which joins together the centres of the two circles, i.e. the larger circle and the smaller circle. The spring 80 is shown as having one end (bottom end) stationary and the other end (top end) attached to a point P of the smaller circle. The rectilinear trajectory (direction of deformation y) along which the point P moves is shown by means of a broken line. $l_0$, p and d indicate, respectively, the free length, the preload and the deformation (elongation) of the spring 80. The rolling movement of the smaller circle inside the larger circle is converted into a translational movement of the point P along the direction of deformation y, the deformation d of the spring 80 being equal to the displacement of the point P along the direction y. In this connection it should be noted that, starting from a zero deflection condition ($\theta$=0), a positive or negative deflection (i.e. a relative angular rotation of the shaft 84 with respect to the final output member 20 in either direction) always causes a deformation d of the spring 80 in the direction of extension. The elastic force produced by the spring 80 as a result of the deformation d produces an elastic torque T about the centre of the larger circle, i.e. about the axis of rotation x of the actuator, which varies depending on the deflection angle θ according to the following relation:

$$T(\theta)=K\cdot 2r\cdot\sin\theta\cdot(2r\cdot(1-\cos\theta)+p),$$

where K is the rigidity of the spring 80.

Figure 12:
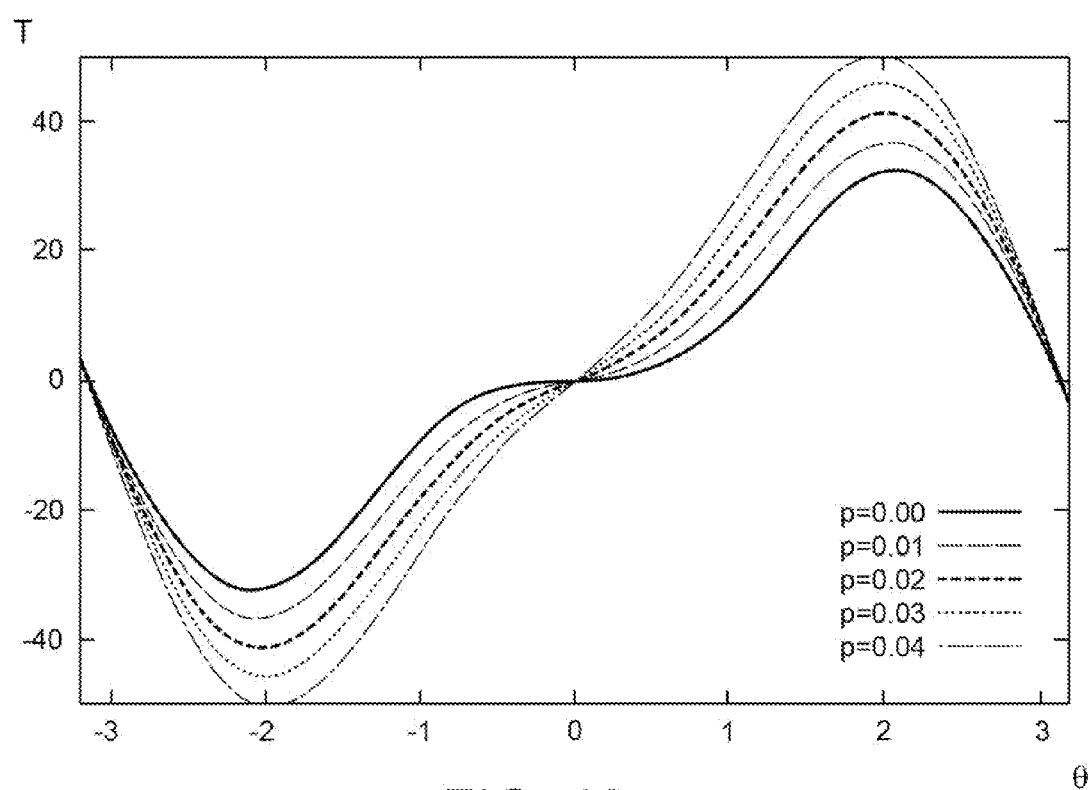
FIG. 12 shows a graph of the progression of the torque generated by the elastic unit of the elastic rotary actuator of FIG. 1 in relation to the deflection angle.

The above relation between the elastic torque T and the deflection angle θ is shown in the graph in FIG. 12 for certain values of the preload p. As shown in this graph, the hypocycloid mechanism produces a positive torque for values of the deflection angle θ ranging between −2 and +2 radians, i.e. between −120° and +120°. The range of ±120° of the deflection angle θ is halved with the use of the differential unit 16 described above. Obviously, this range may be further reduced, for example, by a factor 3, with alternative designs of the differential unit. The differential unit 16 could also be dispensed with, if a range of ±120° of the deflection angle θ were considered to be acceptable and priority were to be given to a reduction in the weight and the overall costs of the actuator if the unit were eliminated.

In the light of the description provided above the many advantages offered by an elastic rotary actuators according to the present invention are evident, some of which are stated below.

The deflection angle which can be achieved with an actuator according to the present invention (even while the final output member 20 rotates continuously) can vary in a large range which, as mentioned previously, may be as high as ±60°.

In addition, the use of a planetary reduction unit in combination with a hypocycloid mechanism for producing a non-linear elastic deformation of the elastic means (e.g. spring 80 or comparable device) provides a very low reflected inertia of the actuator.

The use, as elastic means, of a single spring able to store energy independently of the direction of deflection provides symmetrical operation of the actuator in both directions of rotation and allows the overall weight of the actuator to be kept very low.

The high degree of deformation of such spring which can be obtained by using a hypocycloid mechanism, makes it possible to store a large amount of elastic energy (which increases with the square of the deformation), without generating excessive elastic forces (since the elastic force increases in proportion to the deformation).

The use of a tensioning member to vary the preload of the spring allows one to vary the non-linear progression of the spring deformation depending on the deflection angle and to vary the stiffness of the actuator.

The integration of the hypocycloid mechanism with the planetary gearing of the differential unit or, in the absence of the differential unit, with the planetary gearing of the reduction unit, allows one to obtain a very compact actuator.

The use of an angular position sensor (optical encoder 106) which directly measures the relative angular position of the final output member 20 with respect to the shaft 84, i.e. directly measures the deflection angle θ, allows one to obtain a more accurate measurement of the torque on the final output member 20 compared to the use of an angular position sensor designed to measure the absolute angular position (i.e. the position measured with respect to the stationary part of the actuator represented by the casings 28 and 56) of the final output member 20.

It should be noted that the embodiments and the constructional details may be modified with respect to those described and illustrated purely by way of a non-limiting example, without thereby departing from the scope of the invention as defined in the accompanying claims.

For example, as already mentioned above, the differential unit could be dispensed with, and in that case the shaft 84 of the elastic unit 18 would be rigidly connected for rotation with the planet carrier 62 of the reduction unit 14. In addition, the configuration of the gear systems used for the reduction unit 14 and for the differential unit 16 could be different from that described and illustrated here. As a further variant, an actuating device could be provided (for example a linear electric motor or a rotary electric motor associated with a motion conversion mechanism such as a screw and nut mechanism) which is designed to operate the tensioning member and thus vary in an active and controllable manner the preload of the spring. A rotary motor of another type, for example a hydraulic, pneumatic or other motor, could be used, instead of a rotary electric motor. Moreover, a spring or elastic means of another type, such as a compression spring, a corrugated washer, an elastic band, an air spring, etc., could be used as elastic means, instead of a helical spring.

What is claimed is:

1. A rotary actuator comprising:
   a final output member rotatable about an axis of rotation;
   a motor unit designed to drive the final output member for rotation about said axis of rotation; and
   an elastic unit arranged between the motor unit and the final output member and having an input member torsionally coupled to the motor unit and an output member rigidly connected for rotation with the final output member,
   wherein the elastic unit comprises an elastic element and a hypocycloid mechanism designed to convert a relative rotation of the input member with respect to the final output member about said axis of rotation into elastic deformation of said elastic element along a direction of deformation, in such a way that the deformation of said elastic element varies in a non-linear manner depending on said relative rotation, wherein said elastic unit comprises a shaft as input member, a ring gear assembly as output member, a gearwheel assembly and an actuating member connected to said elastic element,
   wherein the shaft extends with its own axis parallel to said axis of rotation at a certain distance therefrom,
   wherein the ring gear assembly comprises at least one internal-tooth ring gear, the axis of which coincides with said axis of rotation,
   wherein the gearwheel assembly comprises at least one gearwheel freely rotatably mounted on the shaft and meshing with said at least one internal-tooth ring gear,
   wherein said at least one gearwheel has a number of teeth which is half the number of teeth of said at least one internal-tooth ring gear, and
   wherein the actuating member is hinged at a proximal end thereof to the gearwheel assembly about a hinge axis positioned on the pitch circle of said at least one gearwheel,
   in such a way that as a result of the rotation of the shaft, and hence of the gearwheel assembly, relative to the ring gear assembly, and hence relative to the final output member, the hinge axis about which the actuating member is hinged to the gearwheel assembly moves along said direction of deformation.

2. The rotary actuator of claim 1, wherein the ring gear assembly comprises two internal-tooth ring gears having the same number of teeth and a spacer member axially arranged between the two internal-tooth ring gears and rigidly connected for rotation therewith, wherein the gearwheel assembly comprises two gearwheels having the same number of teeth each of which mesh with a respective internal-tooth ring gear of the ring gear assembly, and a spacer member axially arranged between the two gearwheels of the gearwheel assembly and rigidly connected for rotation therewith, and wherein the actuating member is hinged to the spacer member of the gearwheel assembly.

3. The rotary actuator of claim 2, wherein the elastic unit further comprises an angular position sensor designed to measure said relative rotation.

4. The rotary actuator of claim 1, wherein the elastic unit further comprises an angular position sensor designed to measure said relative rotation.

5. The rotary actuator of claim 1, wherein said elastic element comprises a helical spring arranged with its own axis along said direction of deformation.

6. Rotary actuator according to claim 5, wherein the actuating member is a rod extending along said direction of deformation.

7. The rotary actuator of claim 1, wherein the elastic element further comprises preload adjusting means designed to adjust the preload of said elastic unit.

8. The rotary actuator of claim 1, further comprising a reduction unit arranged between the motor unit and the input member.

9. The rotary actuator of claim 8, wherein the reduction unit and the differential unit are made as planetary gearings.

10. The rotary actuator of claim 8, further comprising a differential unit arranged between the reduction unit and the input member.

11. The rotary actuator of claim 10, wherein the reduction unit and the differential unit are made as planetary gearings.

12. A rotary actuator comprising:

a final output member rotatable about an axis of rotation;

a motor unit designed to drive the final output member for rotation about said axis of rotation; and an elastic unit arranged between the motor unit and the final output member and having an input member torsionally coupled to the motor unit and an output member rigidly connected for rotation with the final output member, wherein the elastic unit comprises an elastic element and a hypocycloid mechanism designed to convert a relative rotation of the input member with respect to the final output member about said axis of rotation into elastic deformation of said elastic element along a direction of deformation, in such a way that the deformation of said elastic element varies in a non-linear manner depending on said relative rotation, and wherein the elastic element further comprises preload adjusting means designed to adjust the preload of said elastic unit.

* * * * *